United States Patent
Santiago et al.

(10) Patent No.: US 7,142,679 B2
(45) Date of Patent: Nov. 28, 2006

(54) MUTING CIRCUIT FOR COMPUTER HAVING DUAL AUDIO BOARDS

(75) Inventors: Christopher Santiago, Spring, TX (US); Leech Philip, Houston, TX (US); Christopher Rijken, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 866 days.

(21) Appl. No.: 10/161,390

(22) Filed: May 31, 2002

(65) Prior Publication Data

US 2003/0223594 A1    Dec. 4, 2003

(51) Int. Cl.
*H02B 1/00* (2006.01)

(52) U.S. Cl. ...................................... 381/123
(58) Field of Classification Search ............... 381/94.5, 381/123, 119

See application file for complete search history.

(56) References Cited

U.S. PATENT DOCUMENTS

| | | | |
|---|---|---|---|
| 3,873,905 A * | 3/1975 | Marek ......................... | 323/350 |
| 5,570,427 A | 10/1996 | Nishioka | |
| 6,007,228 A * | 12/1999 | Agarwal et al. .............. | 700/94 |
| 6,154,548 A | 11/2000 | Bizzan | |
| 6,928,175 B1 * | 8/2005 | Bader et al. ................ | 381/123 |

* cited by examiner

*Primary Examiner*—Curtis Kuntz
*Assistant Examiner*—Alexander Jamal

(57) ABSTRACT

The invention relates to a Muting Circuit used to control the path of signal flow for the amplified audio signals from an audio CODEC in a dual audio subsystem. More specifically, to the muting control of the rear and front panel head phone/line out and microphone connectors for the audio subsystem of a standard PC system. The present invention implements muting on the headphone 1 line-out jacks while allowing the Front Audio Board to be optional without the need for jumpers.

9 Claims, 3 Drawing Sheets

MUTING CIRCUIT FOR COMPUTER HAVING DUAL AUDIO BOARDS

FIELD OF THE INVENTION

Introduction and Background

The invention relates to a method and apparatus for the muting control of the rear and front panel head phone/line out and microphone connectors. More specifically, to the muting controller for the audio subsystem of a standard PC system. The present invention implements muting on the headphone 1 line-out jacks while still allowing the Front Audio Board (FAB) to be optional without the need for jumpers.

Optional front audio (Head Phone/Lineout and Microphone) connector boards in addition to the standard rears audio connectors in PCs, usually require that once a user plugs into the front headphone jack, the rear jack must mute so that you could not hear anything plugged into the rear line-out jack. Previously, other implementations (see Intel standard) assumed that the FAB has the HP/Lineout, Microphone Jacks and another rear audio connector has the Lineout/Line in Jacks and both connectors were always present or, when not present jumpers were used to simulate the pass-through nature of the FAB. Typically, this required a technician to disable the FAB or install the correct jumpers. Attempts to arrive at a method to provide both a FAB and rear head phone/line out and microphone (RAB) have encountered a tri-fold problem. First, if both the FAB and RAB are open or if additional circuitry were added, the user would experience a severe reduction in sound quality. Second, it required a means to selectively control the audio signal flow from FAB to RAB. Third, complete audio functionality must be insured if either the FAB or RAB were not installed.

While muting circuits are well known none address the problems as recited above. For example, U.S. Pat. No. 6,154,548 issued to Bizzan Nov. 28, 2000 discloses an Audio Control Signal Generating Circuit.

Additionally, U.S. Pat. No. 5,570,427 issued to Nishioka Oct. 29, 1996 discloses a muting control circuit for a computer audio subsystem. Neither circuit teach nor disclose a system for muting control in the event a dual audio board system is present, which supports HP/Line out option at both end.

What is needed is a muting circuit for a computer audio subsystem having front and rear audio boards that can be selectively muted by the user without the use of jumpers or service technicians.

SUMMARY OF THE INVENTION

The audio muting circuitry allows the user to selectively use both a first and second audio board without a reduction in sound quality. Additionally, audio functionality is insured if either board is not installed without the use of jumpers or the use of a service technician. More specifically, two distinct audio paths are created. The audio signal from the CODEC is received and the muting circuit determines if the first audio board is present. If the first board is not present a signal is generated that is at logic level 1 (positive logic) sent to the muting circuit. The audio signal is then routed through the muting circuit passing the signal to the second audio board. If the first audio board is present a signal is generated that is logic level 0 and sent to the muting circuit. The audio signal is blocked through the muting circuit and, the audio signal must travel through the first audio board. If the make or break connection of the first audio board is not engaged than the connection at the first audio board is muted and the audio signal allowed to travel to the second audio board. If the make or break connection is engaged this forces a mechanical breaking of the audio signal path indicating that the first audio board is in use and the signal filters through the first audio board output device.

Using Field Effect Transistors (FET) that either block or pass the audio signal through the muting circuit, if no first audio board is present the audio signal is allowed to pass through to the second. If the first audio board is present but no connection is made at the first audio board, then the audio signal passes to the second audio board while muting the first audio board. In the event a connection is detected at the first audio board then the second audio board is muted. Thus, this novel circuitry allows for the selective use of dual audio boards, with no additional jumpers or technicians.

It is an object of the invention to method of selective audio muting for a computer having dual audio boards that can support HP/Lineout at both cards.

It is another object of the invention to provide muting circuitry for a computer allowing the use of dual audio boards or a single board without additional actions by the user.

Another object of the invention is to provide a muting circuitry for using Front and Rear Audio Boards with HP/Lineout connectors.

Another object of the invention is to provide the option of using either a Front or Rear Audio Board without a reduction in sound quality.

Lastly, it is another object of the invention to provide a low cost muting controller for a dual audio board system.

Other features and advantages of the present invention will be apparent from the following description in which the preferred embodiments have been set forth in conjunction with the accompanying drawings

BRIEF DESCRIPTION OF THE DRAWINGS

Reference will now be made in detail to the present preferred embodiment of the invention, an example of which is illustrated in the accompanying drawings.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

DETAILED DESCRIPTION OF THE INVENTION

In the present invention, the Muting Circuit is used to control the path of signal flow for amplified audio signals from the CODEC (1) in an audio subsystem having dual audio boards. It is necessary since it requires two distinct paths that audio signals can travel to the front and rear headphone jacks. The muting circuit controls the path of audio signal as it travels, through the use of a unique configuration of FETs (Q1 and Q2).

Figure 1:
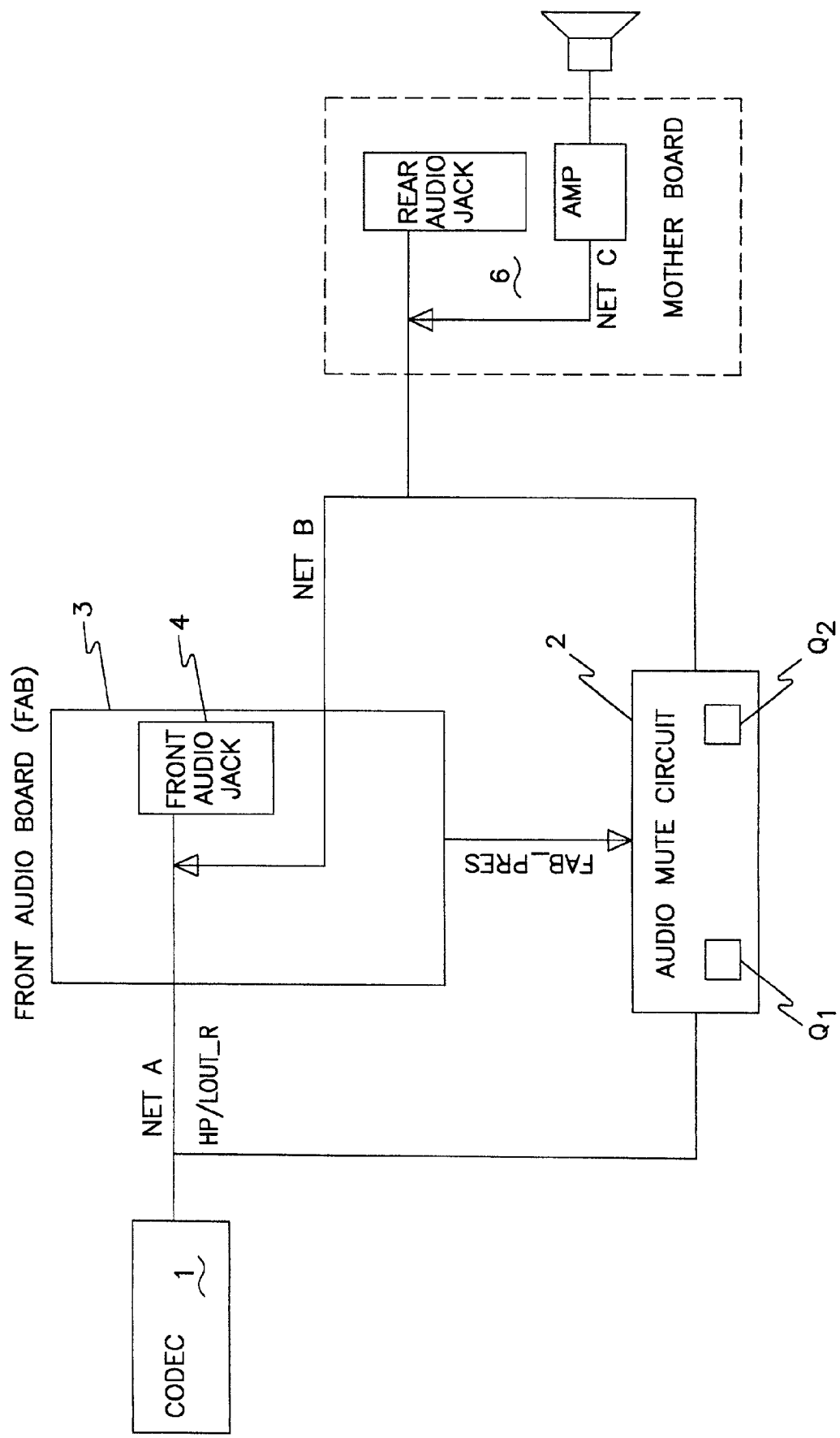
FIG. 1 shows a block diagram of the audio signal flow through the muting circuit.

Referring to FIG. 1, these FETs (Q1 and Q2) block or pass the audio signal traveling through them from Net A to Net B. For the blocking mode of operation, the FAB (3) is plugged into the muting circuit (2). The enabling or disabling of the block or pass mode is provided by generating the FAB presence signal (FAB-PRES). When the FAB is present, the FAB-PRES voltage is at logic level 0, thus turning off the FETs (Q1 and Q2). The audio signal must now travel through the FAB (3) in order to get from Net A to Net B. The FAB (3) uses a 'make-break' audio jack (4) for the front headphone 1 line-out signal. This forces a mechanical breaking of the signal path when a user plugs an audio plug into the FAB jack (4). This causes the muting effect to occur since physically the electrical connection from Net A to Net B has been severed. When the FAB jack (4) does not have anything plugged in, the audio signal is free to pass back down to system board (6). In the event that the FAB (3) is not present in the audio subsystem, FETs (Q1 and Q2) operate in the pass-through mode. The absence of the FAB (3) causes the FAB-PRES signal voltage to at logic level 1. Thus allowing the FETs (Q1 and Q2) to be fully biased, passing all audio signal through from Net A to Net B.

Figure 2:
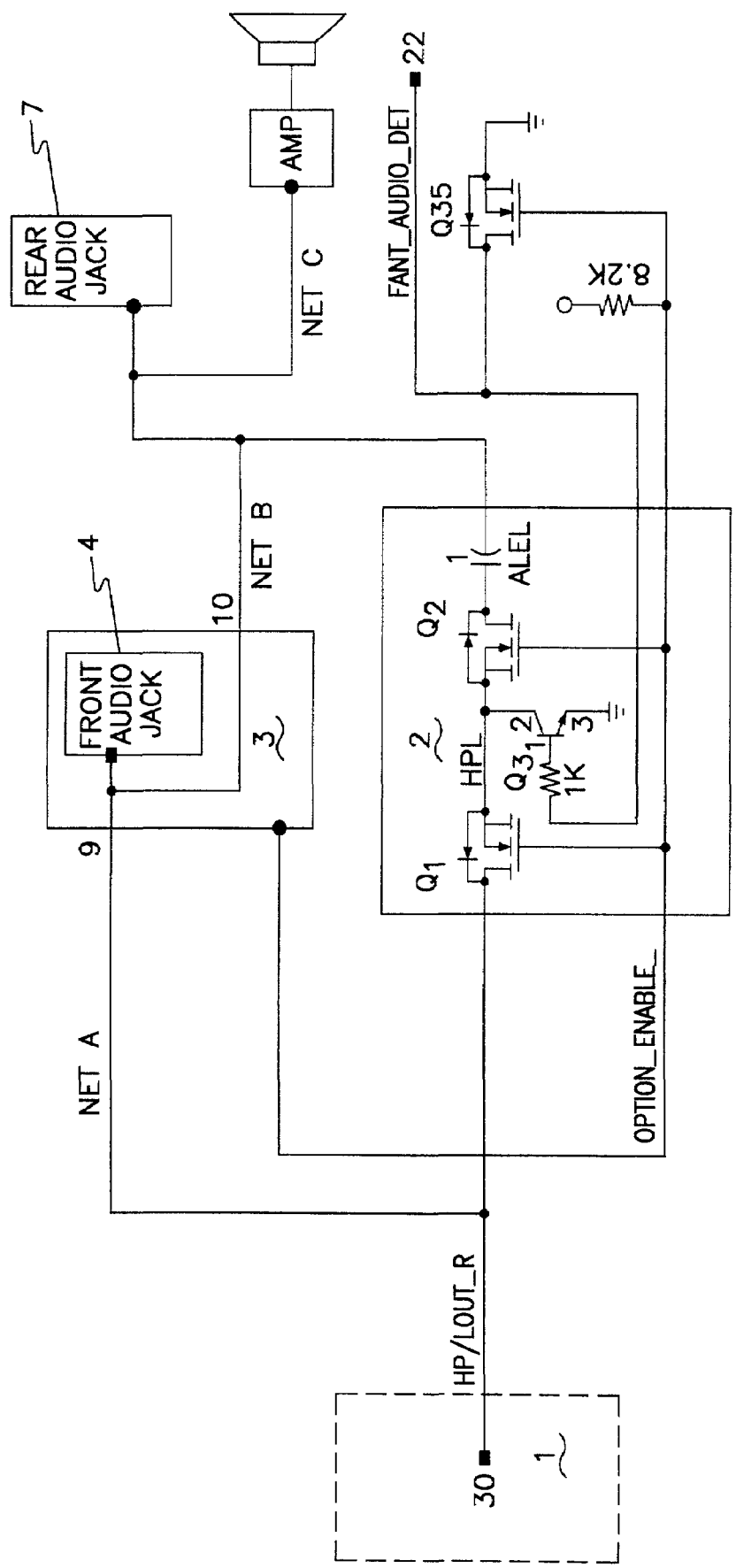
FIG. 2 shows a right channel schematic of the muting circuit.

As shown in FIG. 2, in the Muting Circuit (2) the Bipolar Junction Transistor (Q3) is needed to prevent signal leakage from Net A and Net B through the FETs (Q1 and Q2) when in the blocking mode of operation. Signal leakage is inherent to all real FET devices and is necessary in implementations that have to control amplified audio signals. Again if the FAB jack (4) is not engaged then the signal flow is allowed to travel from Net A to Net B and out through the rear audio jack (7).

Figure 3:
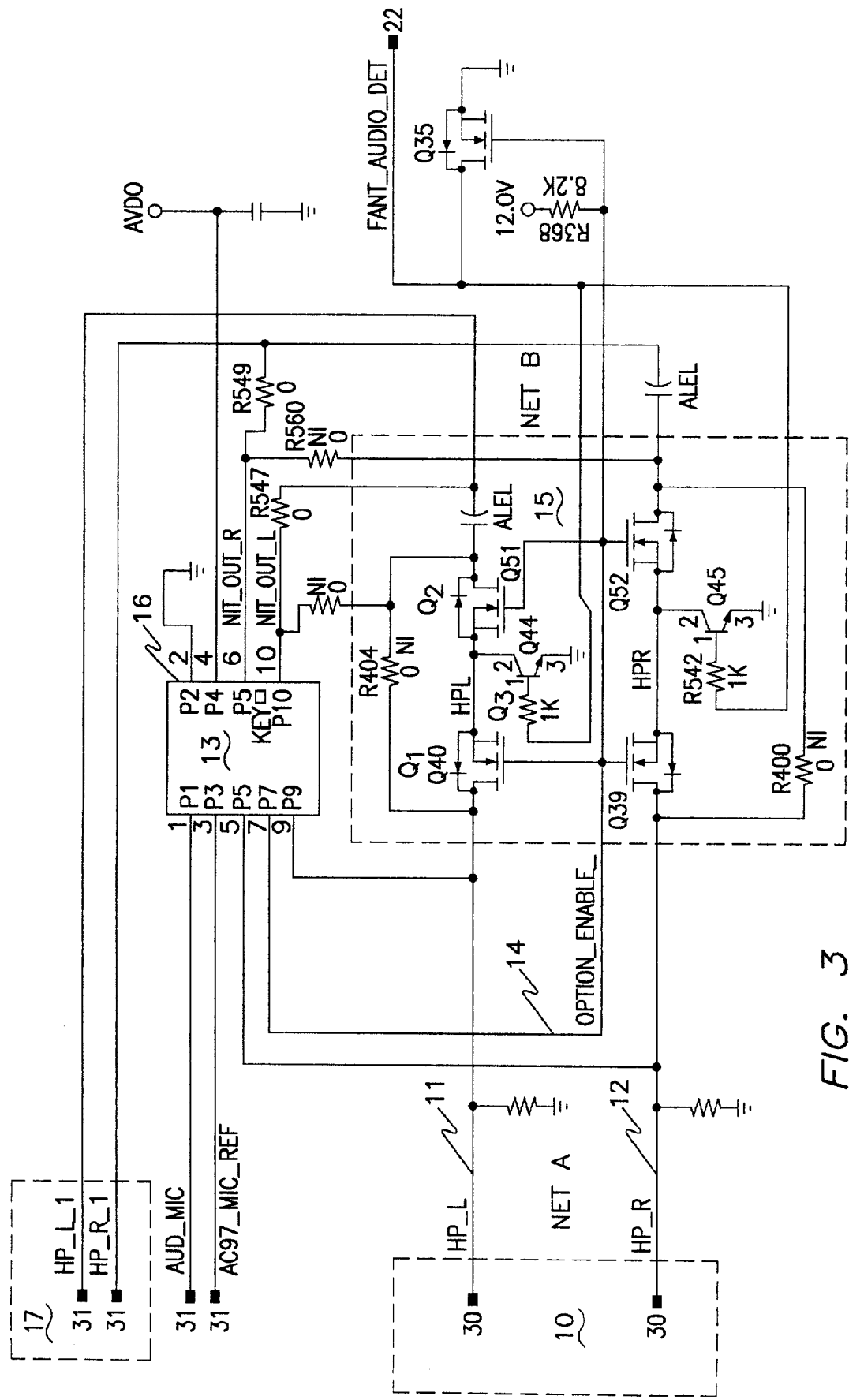
FIG. 3 shows a schematic of both left and right channels.

FIG. 3 shows the CODEC (10) sending the right and left channel signals (11, and 12). If the FAB (13) is plugged in then the signals (11, and 12) are routed through the FAB (13). A FAB-PRES signal (14) sent to the muting circuit (15). That signal level can be either logic level 0 (mute) or Logic level one (pass through) If the make or break connection of the head phone jack (16) is engaged, then the right and left signals (11, and 12) from CODEC will reach or severed going to the RAB.). The FETs (Q1, Q2, and Q3) are biased in such a manner that no signal can travel from NET A to NET B.

If no FAB is present the signals (11, and 12) are routed through the muting circuit 15 the FETs Q1 and Q2 are ON, and Q3 is OFF and the signal (11, and 12) are allowed to pass from NET A to NET B and out the RAB (17).

The invention has been described in detail with particular reference to certain preferred embodiments thereof, but it will be understood that variations and modifications can be effected within the spirit and scope of the invention. Such modifications and variations, as included within the scope of these claims are to be considered part of the invention as described.

PARTS LIST

1. CODEC
2. Muting Circuit
3. Front Audio Board (FAB)
4. Make-Break Audio Jack
6. System Board
7. Rear Audio Jack
10. CODEC
11. Right Channel Signals
12. Left Channel Signals
13. Front Audio Board
14. FAB-PRES Signal
15. Muting Circuit
16. Head Phone Jack
Q1. Field Effect Transistor
Q2. Field Effect Transistor
Q3. Bipolar Junction Transistor

What is claimed is:

1. A method of muting an audio system having dual audio boards with HP/Lineout comprising:
   receiving an audio signal from a CODEC;
   detecting the presence of a first audio board, upon determining that the first audio board is present, sending a signal having a logic level 0 to the muting circuit and upon determining that the first audio board is not present, sending a signal having a logic level 1 to the muting circuit;
   generating a secondary signal and sending it to a muting circuit, where the muting circuit includes a first field effect transistor and second field effect transistor; and
   routing said audio signal selectively through a first or second audio system path, whereby at least one of said audio system paths route through said muting circuit;
   where the first field effect transistor and the second field effect transistor are energized when the secondary signal has a logic level 1.

2. The method as recited in claim 1, where the first field effect transistor and the second field effect transistor are not energized when the secondary signal has a logic level 0.

3. The method as recited in claim 1 where routing said audio signal comprises sending said audio signal through said second audio system path to a second audio board.

4. The method as recited in claim 2, where routing said audio signal comprises sending said audio signal through said first audio system path to the first audio board.

5. The method as recited in claim 4 wherein said first audio board comprises a make-break connection to selectively cause the audio signal to flow through the make-break connection to an output device when the make-break connection is engaged.

6. The method as recited in claim 4 wherein said first audio board comprises a make-break connection to selectively cause the audio signal to flow through the make-break connection to a second audio board when the make-break connection is not engaged.

7. The method as recited in claim 2 wherein said muting circuit comprises a bipolar junction transistor to prevent signal leakage in the muting circuit.

8. A method, comprising:
   receiving in a muting circuit an audio signal from a CODEC, the muting circuit comprising at least two field effect transistors and a bipolar junction transistor configured to prevent signal leakage in the muting circuit;
   detecting, by the muting circuit, the presence of a first audio board, the presence of the first audio board being detectable based on a voltage provided on a first board present line, the first audio board comprising a first plug, a first HP/Lineout, and a first logic configured to manipulate the audio signal;
   detecting, in the muting circuit, the presence of a second audio board, the second audio board comprising a second plug, a second HP/Lineout, and a second logic configured to manipulate the audio signal; and selectively routing the audio signal through the muting circuit based, at least in part, on the voltage provided on the first board present line.

9. An apparatus for muting an audio system having dual audio boards having an HP/Lineout, comprising:

means for receiving an audio signal from a CODEC;

means for detecting the presence of a first audio board including means for sending a signal having a logic level 0 to the muting circuit upon determining that the first audio board is present and means for sending a signal having a logic level 1 to the muting circuit upon determining that the first audio board is not present;

means for generating a secondary signal and sending it to a muting circuit, where the muting circuit includes a first field effect transistor and second field effect transistor; and means for routing said audio signal selectively through a first or second audio system path, whereby at least one of said audio system paths route through said muting circuit;

where the first field effect transistor and the second field effect transistor are energized when the secondary signal has a logic level 1.

* * * * *

UNITED STATES PATENT AND TRADEMARK OFFICE
CERTIFICATE OF CORRECTION

PATENT NO. : 7,142,679 B2  Page 1 of 1
APPLICATION NO. : 10/161390
DATED : November 28, 2006
INVENTOR(S) : Christopher Santiago et al.

It is certified that error appears in the above-identified patent and that said Letters Patent is hereby corrected as shown below:

In column 1, line 40, after "Audio" insert -- Mute --.

Signed and Sealed this

Thirteenth Day of January, 2009

JON W. DUDAS
*Director of the United States Patent and Trademark Office*